United States Patent [19]

Shigaki et al.

[11] Patent Number: 4,893,180
[45] Date of Patent: Jan. 9, 1990

[54] COLOR IMAGE SIGNAL PROCESSING METHOD

[75] Inventors: Takao Shigaki; Osamu Shimazaki; Hitoshi Urabe, all of Kaisei, Japan

[73] Assignee: Fuji Photo Film Co., Ltd., Kanagawa, Japan

[21] Appl. No.: 334,758

[22] Filed: Apr. 6, 1989

Related U.S. Application Data

[63] Continuation of Ser. No. 928,824, Nov. 10, 1986, abandoned.

[30] Foreign Application Priority Data

Nov. 9, 1985 [JP] Japan .................................. 60-251573

[51] Int. Cl.$^4$ ............................................... H04N 1/46
[52] U.S. Cl. .......................................... 358/80; 358/75
[58] Field of Search ............................... 358/75, 76, 80

[56] References Cited

U.S. PATENT DOCUMENTS

| | | | |
|---|---|---|---|
| 4,328,515 | 5/1982 | Wellendorf | 358/80 |
| 4,472,736 | 9/1984 | Ushio et al. | 358/75 |
| 4,591,904 | 5/1986 | Urabe et al. | 358/75 |
| 4,642,684 | 2/1987 | Alkofer | 358/80 |
| 4,677,465 | 6/1987 | Alkofer | 358/80 |

FOREIGN PATENT DOCUMENTS

| | | |
|---|---|---|
| 58-175055 | 10/1983 | Japan . |
| 60-37878 | 2/1985 | Japan . |
| 60-216350 | 10/1985 | Japan . |
| 60-216353 | 10/1985 | Japan . |

Primary Examiner—James J. Groody
Assistant Examiner—Robert M. Bauer
Attorney, Agent, or Firm—Wenderoth, Lind & Ponack

[57] ABSTRACT

A color image signal processing method for a color image input/output system reads an original by an image input section and corrects the color and gradation of the thus obtained image signals and feeds output density signals for each color to an image output device. The processing method includes the steps of calculating differences between desired finished densities and the output density signals at specified points on the original which are obtained by converting input density signals on the specified points based upon reference gradation conversion curves and then prepares characteristic curves of the differences with respect to the output density signals using the same functions for the respective colors and then prepares corrected gradation conversion curves by adding the reference gradation conversion curves to the functions. The functions are then determined so that the corrected gradation conversion curves are within a specified inclination range so as to thereby correct a gradation conversion table as well as correcting a color correction table by limiting the values of color correction coefficients so as to remove color distortion of output images.

5 Claims, 2 Drawing Sheets

COLOR IMAGE SIGNAL PROCESSING METHOD

This application is a continuation of application Ser. No. 06/928,824 filed Nov. 10, 1986, now abandoned.

BACKGROUND OF THE INVENTION

1. Field of the Invention

The present invention relates to a color image signal processing method which can automatically correct gradation conversion curves and color correction coefficients for converting input image signals into output image signals in a manner to finish specified points at desirable density in a color image input/output system such as a color scanner, a laser color printer, a lay-out scanner and so on.

2. Description of the Prior Art

When color images are outputted in a color image input/output system, it is often preferable to finish extremely precisely not only the whole tone but also the color tone of specified points. To meet such demands, in the case of ordinary printing scanners, for instance, a read-out head is manually moved to a specified point on an original which is pasted on an input drum to read the density at the specified point such that the final dot percentage at the point is assumed. Then, an operator should adjust gradation conversion or color correction levels by manually turning respective dials to set the final dot percentage at a desirable level. However, such manual operation requires skill and experience on the part of the operator and also takes time. The method is further easily influenced by individual preferences of the operator and seldom achieves a uniform finish.

In recent years there have been proposed methods for automatically correcting gradation conversion curves and color correction coefficients (e.g. Japanese Patent Laid-open No. 216353/1985). Most of these proposed methods, however, tend to upset the gray balance which was kept up until the correction when the gradation conversion curves are corrected. Moreover, if the density at a specified point is determined by color correction processing alone, the coefficient for the color correction often increases more than necessary to upset the color at other points. When it is necessary to finish output images precisely, they must further be corrected by the aforementioned manual operation even after they have gone through the automatic correction processing.

SUMMARY OF THE INVENTION

The present invention was contrived to obviate such problems encountered in the prior art and aims to provide a color image signal processing method which is capable of automatically setting a gradation conversion table and a color correction table to realize a desired density at specified points on an input original without upsetting the gray balance and without disturbing densities at other points than the specified points.

According to one aspect of this invention, for achieving the object described above, there is provided a color image signal processing method for a color image input/output system which is adapted to read an original by an image input section, and correct in color and gradation the thus obtained image signals, and feed output density signals for each color to an image output device, which comprises the steps of: calculating differences between desired finish densities and the output density signals at specified points on said original which are obtained by converting input density signals on said specified points based upon reference gradation conversion curves; and setting a gradation conversion table under first restraint conditions and a color correction table under second restraint conditions for said color correction processing in a manner to satisfy characteristic curves of said differences from said output density signals.

The nature, principle and utility of the invention will become more apparent from the following detailed description when read in conjunction with the accompanying drawings.

DESCRIPTION OF THE PREFERRED EMBODIMENTS

Figure 1:
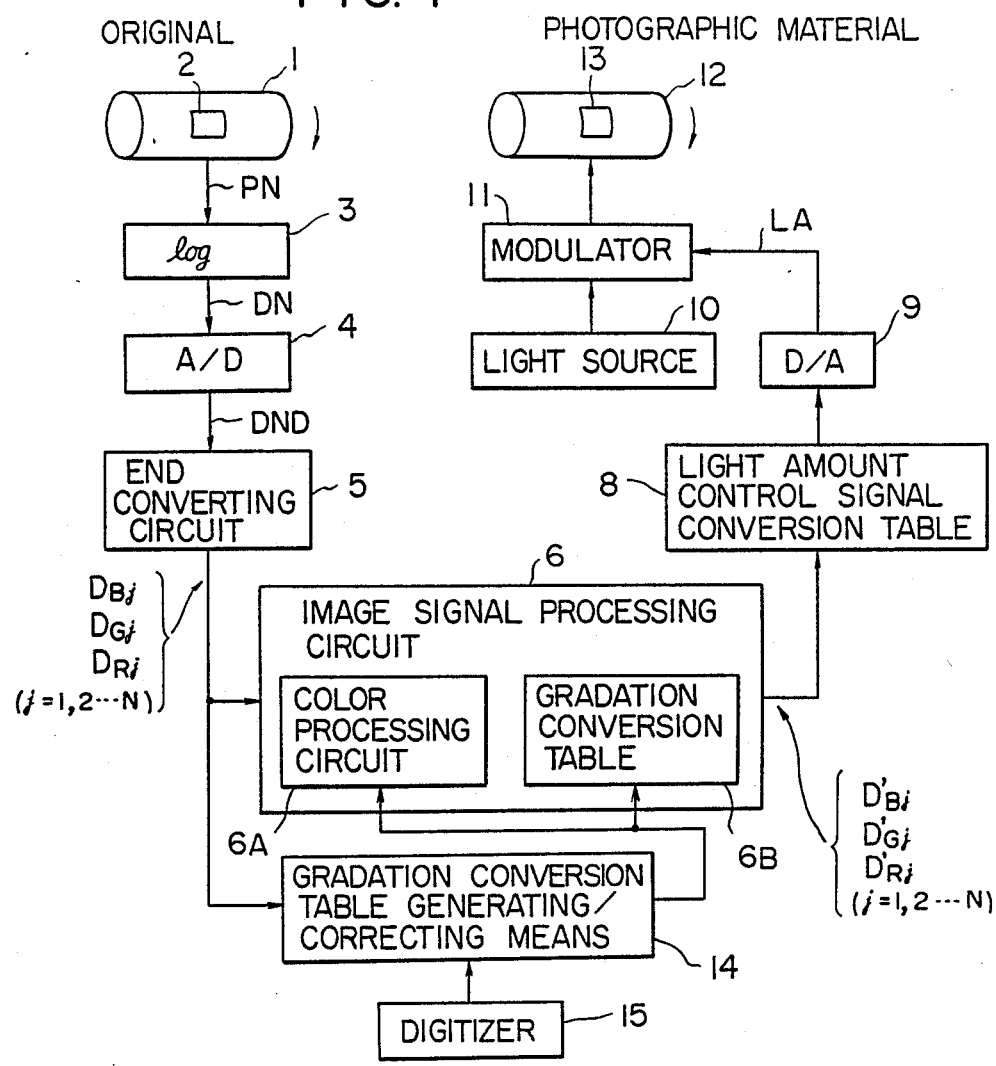
FIG. 1 is a block diagram showing an embodiment which realizes this invention method.

FIG. 1 is a block diagram of an embodiment to realize this invention method. A color original 2 set on the surface of a rotating input drum 1 is converted by an electro-optical converting means (not shown) into image signals PN (B,G,R) of each color in corresponding densities. The image signals PN are inputted to a logarithmic converting circuit 3. The image signals PN are converted into density signals DN by the logarithmic converting circuit 3, and then converted into digital signals DND by an A/D converter 4, and then inputted to an END (Equivalent Neutral Density) converting circuit 5, and outputted from the END converting circuit 5 as density signals of each color in digital values $D_{Bj}$, $D_{Gj}$, and $D_{Rj}$ (j=1,2, ... N) which have been converted in equivalent neutral density. These input density signals $D_{Bj}$, $D_{Gj}$ and $D_{Rj}$ are subjected to color correction processing (e.g. Japanese Laid-open Patent No. 178355/1983) through a color correction table 6A of an image signal processing circuit 6 and to sharpness enhancement processing (e.g. Japanese Laid-open Patent Application No. 175055/1983), processed in a gradation through a gradation conversion table 6B which is prepared by a manner to be described hereinafter, and outputted as output density signals of each color $D_{Bj}'$, $D_{Gj}'$ and $D_{Rj}'$ (j=1,2, ... N). They are passed through a light amount control signal conversion table 8, and inputted to a D/A converter 9 to be converted into analog light amount control signals LA. The control signals LA are inputted to a modulator 11 which modulates the recording light from a light source 10 for exposure. The modulated recording light is outputted from an exposure head (not shown) to reproduce color images on a photographic material 13 on a rotating output drum 12.

Figure 3:
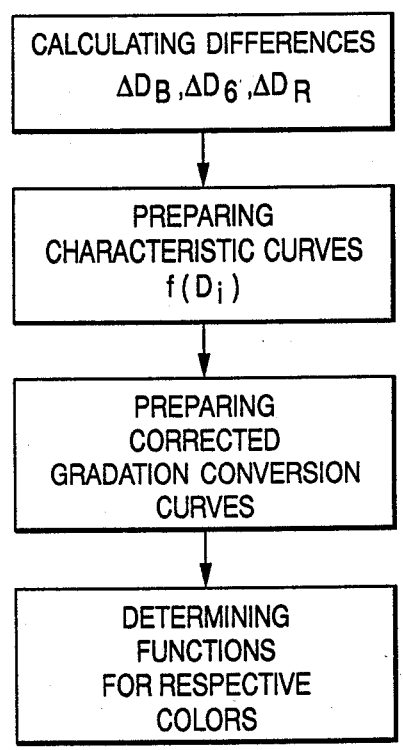
FIG. 3 is a flow chart of the method steps according to the present invention.

A description will now be provided as to the method of preparation of the aforementioned gradation conversion table 6B. See also FIG. 3.

Prior to the full scale scanning for color image output, the color original 2 is first read out by relatively rough pre-scanning. Density signals of each color $D_{Bj}$, and $D_{Rj}$ which have been converted to equivalent neutral density and read by the above pre-scanning are not sent to the image signal processing circuit 6 but are transferred to a gradation conversion table and color correction table generating/correcting means 14. The gradation conversion table and color correction table generating/correcting means 14 calculates a cumulative density histogram of the original out of the density signals $D_{Bj}$, $D_{Gj}$ and $D_{Rj}$ of each color to use it as a reference material, and calculates reference gradation conversion curves for each color for optimally converting input density signals into output density signals (refer to the method disclosed in Japanese Laid-open Patent Application No. 37878/1985). However, if the data on the reference gradation conversion curves thus prepared are used as the gradation conversion table 6B without modification, they sometimes upset the gray balances of each color. Furthermore, when the signals are processed in color correction by the image signal processing circuit 6 to determine color correction coefficients and if they are processed without modification, the color correction coefficients will become large enough to disturb images at points other than those specified.

In order to avoid such inconveniences, the gradation conversion table 6B and the color correction table 6A are automatically set by the following method of this invention.

An operator sets a color original 2 on a digitizer 15 or a coordinate input means before setting the same on the input drum 1, and designates by color patches the points on the output images on the photographic material 13 where densities should be finished as specified. The number of points is arbitrary. This data on designated points is inputted to the gradation conversion table and color correction table generating/correcting means 14 and stored therein. The coordinates of the digitizer 15 correspond in a one-to-one relationship with the coordinates in the input drum 1. At the time of pre-scanning, the generating/correcting means 14 reads out the density signals $D_{Bj}$, $D_{Gj}$ and $D_{Rj}$ at the designated points. The generating/correcting means 14 then obtains output density signals $D_{Bj}'$ $D_{Gj}'$ and $D_{Rj}'$ out of the reference gradation conversion curves which have been obtained as mentioned above respectively. The relationship determined by the following equation will hold if it is assumed that the desired finish densities are $D_{Bj}^o$, $D_{Gj}^o$ and $D_{Rj}^o$ and the difference between the desired finish densities $D_{Bj}^o$ to $D_{Rj}^o$ and the output density $D_{Bj}'$ to $D_{Rj}'$ are $\Delta D_{Bj}$, $\Delta D_{Gj}$ and $\Delta D_{Rj}$.

$$\left. \begin{array}{l} \Delta D_{Bj} = D^o{}_{Bj} - D_{Bj}' \\ \Delta D_{Gj} = D^o{}_{Gj} - D_{Gj}' \\ \Delta D_{Rj} = D^o{}_{Rj} - D_{Rj}' \end{array} \right\} \quad (1)$$

wherein $j = 1, 2, \ldots N$

Figure 2:
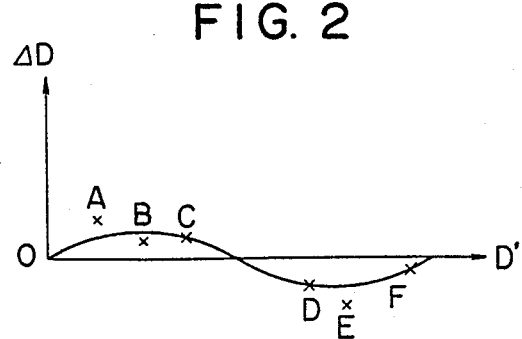
FIG. 2 is a graph showing an example of the characteristic curves of the differences in output density signals.

When the result of calculation by the above equation (1) is plotted in a graph for points A through F, it will become as shown in FIG. 2. If the difference $\Delta D$ becomes zero, then the output $D_{Bj}'$ to $D_{Rj}'$ density signals are identical to the desired finish densities $D_{Bj}^o$ to $D_{Rj}^o$. Since this invention aims at preventing color distortion in output images, functions $f(D_i')$ ($i = B, G, R$) of the following equation (2) which either passes precisely through the points A through F or close thereto are assumed so as to thereby select one function which satisfies the restraint conditions described hereinafter for undistorted output images.

$$\left. \begin{array}{l} \Delta D_B = f(D_B') \\ \Delta D_G = f(D_G') \\ \Delta D_R = f(D_R') \end{array} \right\} \quad (2)$$

If reference gradation conversion curves are denoted as $F_B$, $F_G$ and $F_R$, the corrected gradation conversion curves $F_B'$, $F_G'$ and $F_R'$ for the respective colors below are in accordance with the following equations (3).

$$\left. \begin{array}{l} F_B' = F_B + f(D_B') \\ F_G' = F_G + f(D_G') \\ F_R' = F_R + f(D_R') \end{array} \right\} \quad (3)$$

After repeatedly correcting the curves by the above equations (3), the finally obtained curves are set as the gradation conversion table 6B. This makes it possible to obtain output density signals $D_{Bj}'$ through $D_{Rj}'$ at desired densities without color distortion and with a well balanced gray balance. If the densities desired for the specified points are still not quite completely attained after the above processing, the color correction coefficients should be corrected so as to satisfy the restraint conditions described hereinafter and a new color correction table is set. Prior to the full scale scanning, the input density signals $D_{Bj}$, $D_{Gj}$ ad $D_{Rj}$ are processed in accordance with the corrected gradation conversion table 6B and the corrected color correction table 6A in the image signal processing circuit 6 so as to realize a desired finish at the specified points.

An example of such restraint conditions will be explained hereinafter. Conditions to restrict the inclination of the corrected gradation conversion curves or more particularly the conditions to correct density leaps or noise which otherwise might be caused by quantization effect, and the conditions on the degree of the color correction coefficients or the conditions to prevent color distortion of the images are used to define an optimization function OPF. By minimizing the function OPF, the object of this invention will be more fully achieved.

$$OPF = a \cdot A + b \cdot B + \sum_{k=1}^{N} c_k \cdot C_k \quad (4)$$

$$\text{wherein:} \begin{cases} A = 0 : F_1 \min < F_i < F_i \max \ (i = B, G, R) \\ \phantom{A = } 1 : \text{other than above.} \end{cases} \quad (5)$$

$$B = \sum_{i j} (Q_{ij} - Q^o{}_{ij})^2 \quad (6)$$

wherein:
 $i = Y, M, C$
 $j = Y, M, C, B, G, R$
 $Q_{ij}$: color correction coefficient
 $Q_{ij}^o$: reference color correction coefficient $$C_k = \sum_i \{D^o{}_{ik} - F_i(D_{ik})\}^2 \quad (7)$$

wherein:
 $i = B, G, R$
 $F_i$: corrected gradation conversion curve $a, b, c_k$: weight  $\qquad (8)$ The first term of the right side of the equation (4) is the product of the multiplication of a coefficient A which becomes zero when the gradation of each color stays within the predetermined scope defined by the reference gradation conversion curve and becomes 1 when it is outside of the scope, with a weight coefficient a, and imposes a restriction on the inclination of the gradation conversion curves. The second term is the product of the multiplication of a weight coefficient b with the sum of squares of the difference between color correction coefficients and reference color correction coefficient of the colors, and imposes a restriction on the degree of color correction coefficients. The third term is the product of the multiplication of a weight coefficient $c_k$ with the sum of squares of the difference between desired finish densities and the corrected gradation conversion curve of the colors, and imposes a restriction for approximating it to the desired finish density. The above restraint conditions will be satisfied by selecting $f(D_i')$ (i=B,G,R) defined by the equation (2) out of many functions prepared in advance so as to minimize the optimization function OPF of the equation (4).

Although a description has been made for the colors of B, G, R in the foregoing statement, this invention method is also applicable for black and white prints signals which are used for preparing black print in an ordinary scanner. In using the equation (4) if an attempt is made to finish the densities at designated points in a desirable manner, by merely correcting the gradation conversion curves or by correcting the color correction coefficients alone, the images will be distorted in color. Therefore, the densities should be corrected first by gradation conversion curves to a certain extent and then corrected again by color correction processing. The combination of the above two types of correction may be determined by selecting the appropriate optimization function OPF and weight coefficients, a, b and $c_k$.

As described in detail in the foregoing statement, this invention color image signal processing method can automatically set the gradation conversion table and the color correction table to realize desired densities at specified points on an input original without upsetting the gray balance nor distorting the images in color.

It should be understood that many modifications and adaptations of the invention will become apparent to those skilled in the art and it is intended to encompass such obvious modifications and changes in the scope of the claims appended hereto.

What is claimed is:

1. A color image signal processing method for a color image input/output system which is adapted to read an original by an image input section, to correct in color and gradation thus obtained image signals, and to feed output density signals for each color to an image output device, which comprises the steps of;

calculating differences ($\Delta D_B$, $\Delta D_G$, $\Delta D_R$) between desired finish densities and the output density signals ($D_i'$) at specified points on said original which are obtained by converting input density signals at said specified points based upon reference gradation conversion curves;

preparing characteristic curves ($f(D_i')$) of said differences with respect to said output density signals utilizing a same function for the respective colors, said same function satisfying specified restraint conditions;

preparing corrected gradation conversion curves by adding said reference gradation conversion curves to said functions; and determining said functions so that said corrected gradation conversion curves $F_i$ are within a specified inclination range ($F_{imin} < F_i < F_{imax}$), wherein $F_{imin}$ is a minimum inclination and $F_{imax}$ is a maximum inclination;

thereby correcting a gradation conversion table as well as correcting a color correction table by limiting the values of color correction coefficients so as to remove color distortion of output images.

2. A method as claimed in claim 1, wherein said original is positioned at a coordinate input device so that the specified points can be specified by color patches.

3. A method as claimed in claim 2, wherein said coordinate input device is a digitizer.

4. A method as claimed in claim 1, wherein, if said output density signals for each color are $D_{Bj}'$, $D_{Gj}'$ and $D_{Rj}'$ and said desired finish densities are $D_{Bj}$, $D_{Gj}$ and $D_{Rj}$, then said differences are calculated in accordance with the following equations:

$$\Delta D_{Bj} = D_{Bj}^p - D_{Bj}'$$

$$\Delta D_{Gj} = D_{Gj}^p - D_{Gj}'$$

$$\Delta D_{Rj} = D_{Rj}^p - D_{Rj}'$$

wherein j=1, 2, ... N, and further wherein said gradation conversion table is determined when the curves are obtained by repeatedly processing the following equations:

$$\Delta D_B = f(D_B') \quad F_B' = F_B + f(D_B')$$
$$\Delta D_G = f(D_G') \text{ and } F_G' = F_G + f(D_G')$$
$$\Delta D_R = f(D_R') \quad F_R' = F_R + f(D_R')$$

based upon said difference and said reference gradation conversion curves $F_B$, $F_G$, $F_R$.

5. A method as claimed in claim 4, wherein an optimization function OPF is defined and minimized in accordance with the following equations:

$$OPF = a \cdot A + b \cdot B + \sum_{k=1}^{N} c_k \cdot C_k$$

$$\text{wherein} \begin{cases} A = 0 : F_i \min < F_i < F_i \max (i = B,G,R) \\ \phantom{A =} 1 : \text{other than above.} \end{cases}$$

$$B = \sum_{i,j} (Q_{ij} - Q°_{ij})^2$$

wherein:
i=Y,M,C
j=Y,M,C,B,G,R
$Q_{ij}$: color correction coefficients
$Q_{ij}°$: reference color correction coefficients $$C_k = \sum_i \{D°_{ij} - F_i(D_{ik})\}^2$$

wherein:
i=B,G,R
$F_i$=corrected gradation conversion curve
a, b, $c_k$=weight.

* * * * *